United States Patent
Chatterjee et al.

(10) Patent No.: US 10,853,731 B2
(45) Date of Patent: **\*Dec. 1, 2020**

(54) RULE BASED CONSISTENCY MANAGEMENT FOR COMPLEX SYSTEMS

(71) Applicant: Oracle International Corporation, Redwood Shores, CA (US)

(72) Inventors: Raja Chatterjee, Nashua, NH (US); Ashishkumar Gor, Nashua, NH (US)

(73) Assignee: ORACLE INTERNATIONAL CORPORATION, Redwood Shores, CA (US)

( \* ) Notice: Subject to any disclaimer, the term of this patent is extended or adjusted under 35 U.S.C. 154(b) by 1139 days.

This patent is subject to a terminal disclaimer.

(21) Appl. No.: 15/192,961

(22) Filed: Jun. 24, 2016

(65) Prior Publication Data

US 2017/0228649 A1 Aug. 10, 2017

Related U.S. Application Data

(63) Continuation of application No. 14/589,860, filed on Jan. 5, 2015, now Pat. No. 9,378,461.

(51) Int. Cl.
*G06N 5/02* (2006.01)
*G06F 9/50* (2006.01)
*H04L 12/24* (2006.01)

(52) U.S. Cl.
CPC ........... *G06N 5/025* (2013.01); *G06F 9/5005* (2013.01); *H04L 41/0843* (2013.01); *H04L 41/0873* (2013.01); *H04L 41/0859* (2013.01)

(58) Field of Classification Search
USPC .......................................... 706/47
See application file for complete search history.

(56) References Cited

U.S. PATENT DOCUMENTS 6,594,666 B1\* 7/2003 Biswas ............... G06F 16/9537
6,782,394 B1\* 8/2004 Landeck ............... G06F 16/284
(Continued)

OTHER PUBLICATIONS

Zhao et al., "Heardening Techniques for MRAM-Based non-volatile storage cells and Logic"Radiation and Its Effects on Components and Systems, dated 2011, 12th European Conference, 2011, 669-674 pages.

(Continued)

*Primary Examiner* — Michael B Holmes
(74) *Attorney, Agent, or Firm* — Hickman Palermo Becker Bingham LLP

(57) ABSTRACT

Techniques are for rule-based continuous drift and consistency management for target systems. In one embodiment, a set of rules is stored in volatile or non-volatile store. The set of rules may include one or more drift rules and/or one or more consistency rules. A rule may be applied to one or more associated targets to detect drift or inconsistency. A drift rule identifies a set of one or more attributes and a source and may be applied by comparing a first configuration of the set of one or more attributes on an associated target with a second configuration of the set of one or more attributes on the source. A consistency rule may be applied to a composite target by comparing member targets that are grouped by target type. Notification data may be output if target drift or inconsistency is detected to alert a user.

20 Claims, 6 Drawing Sheets

(56) References Cited

U.S. PATENT DOCUMENTS

| | | | |
|---|---|---|---|
| 6,954,764 B2 * | 10/2005 | Biswas | G06F 16/9537 |
| 7,162,691 B1 * | 1/2007 | Chatterjee | G06F 16/951 |
| | | | 715/205 |
| 7,386,797 B1 * | 6/2008 | Chatterjee | G06Q 10/06 |
| | | | 715/751 |
| 7,555,710 B2 * | 6/2009 | Kobashi | G06K 15/02 |
| | | | 715/243 |
| 7,640,242 B2 * | 12/2009 | Chatterjee | G06F 9/466 |
| 7,644,051 B1 | 1/2010 | Moore | |
| 7,747,591 B2 * | 6/2010 | Chatterjee | G06F 16/2343 |
| | | | 707/704 |
| 7,822,667 B1 | 10/2010 | Smith, III | |
| 8,145,641 B2 * | 3/2012 | Chatterjee | G06F 16/29 |
| | | | 707/743 |
| 8,352,453 B2 * | 1/2013 | Chatterjee | G06Q 10/06 |
| | | | 707/707 |
| 8,380,649 B2 | 2/2013 | Brillhart | |
| 8,578,269 B2 * | 11/2013 | Osaka | G06F 40/103 |
| | | | 715/253 |
| 8,621,550 B1 | 12/2013 | Yehuda et al. | |
| 8,682,832 B2 | 3/2014 | Brillhart | |
| 8,732,291 B2 | 5/2014 | Zhu et al. | |
| 8,896,876 B2 * | 11/2014 | Osaka | G06F 40/103 |
| | | | 358/1.18 |
| 8,955,112 B2 | 2/2015 | Nguyen et al. | |
| 9,200,962 B1 | 12/2015 | Russin | |
| 9,378,461 B1 * | 6/2016 | Chatterjee | H04L 41/0873 |
| 9,430,213 B2 | 8/2016 | Fu et al. | |
| 9,667,489 B2 | 5/2017 | Morris et al. | |
| 9,703,890 B2 | 7/2017 | Kakaraddi et al. | |
| 9,720,763 B2 | 8/2017 | Rajasekharah et al. | |
| 10,158,726 B2 | 12/2018 | Chou et al. | |
| 10,185,345 B2 | 1/2019 | Hanley | |
| 2005/0253795 A1 | 11/2005 | Moriya et al. | |
| 2006/0179171 A1 | 8/2006 | Stefaniak et al. | |
| 2008/0168311 A1 | 7/2008 | Pietrek | |
| 2009/0326728 A1 | 12/2009 | Chrisop | |
| 2010/0010678 A1 | 1/2010 | Dawson | |
| 2010/0321574 A1 | 12/2010 | Kerofsky | |
| 2011/0225275 A1 | 9/2011 | Shah Shon et al. | |
| 2011/0289329 A1 | 11/2011 | Bose | |
| 2011/0302431 A1 | 12/2011 | Diab | |
| 2011/0313978 A1 | 12/2011 | Chatterjee | |
| 2011/0316337 A1 | 12/2011 | Pelio | |
| 2012/0005683 A1 | 1/2012 | Bower | |
| 2012/0016528 A1 | 1/2012 | Raman | |
| 2014/0018969 A1 | 1/2014 | Forbes | |
| 2014/0039965 A1 | 2/2014 | Steven | |
| 2014/0337516 A1 | 11/2014 | Naseh et al. | |
| 2015/0214737 A1 | 7/2015 | Ichino | |
| 2016/0196496 A1 | 7/2016 | Chatterjee et al. | |
| 2016/0370814 A1 | 12/2016 | Hanley | |
| 2017/0214273 A1 | 7/2017 | Kogo | |
| 2017/0295082 A1 | 10/2017 | Wu | |
| 2017/0366428 A1 | 12/2017 | Shaw et al. | |
| 2018/0295154 A1 | 10/2018 | Crabtree | |
| 2019/0041845 A1 | 2/2019 | Cella | |
| 2020/0133688 A1 | 4/2020 | Shinde | |
| 2020/0259722 A1 | 8/2020 | Kocberber | |

OTHER PUBLICATIONS

Wang et al., "Leveraging Non-Volatile Storage to Achieve Versatile Cache Optimizations", Computer Architecture Letters Year: 2015, Volume: 14 1 pp. 46-49, IEEE Journals and Magazines.

Non-Volatile Storage for Mobile Phones Merryfield, V. Communications Engineer Year: 2003, vol. 1, Issue 2, pp. 22-25, DOI: 10.1049/ce:2003020r IET Journals and Magazines.

Moore et al., "Total Dose Effect on Ferroelectric PZT Capacitors Used as Non-Volatile Storage Elements", Nuclear Science, IEEE Transactions on Year: 1993, vol. 40, Issue: 6 pp. 1591-1596.

U.S. Appl. No. 14/589,860, filed Jan. 5, 2015, Notice of Allowance.

Liu et al., "Cloud Resource Orchestration: A DataCentric Approach", 5th Biennial Conference on Innovative Data Systems Research (CIDR '11) Jan. 2011, Asilomar, California, USA, 8 pages.

Andrikopoulos et al., "Optimal Distribution of Applications in the Cloud", dated 2014, 6 pages.

Calcaterra et al., "Combining TOSCA and BPMN to Enable Automated Cloud Service Provisioning" dated 2017, 10 pages.

Cisco Public, "Cisco CloudCenter Solution: Architecture Overview", dated 2017, 10 pages.

Cloud Tidbits Column, "Containers and Cloud: From LXC to Docker to Kubernetes", dated Sep. 2014, 4 pages.

Dukaric, "Towards a Unified Taxonomy and Architecture of Cloud Frameworks", Future Generation Computer Systems dated 2013, 5 pages.

Fujitsu, "Fujitsu FlexFrame® Orchestrator V1.1A Solution", Data Sheet, FlexFrame® Orchestrator V1.1A, dated Dec. 15, 2014, 6 pages.

IBM, "IBM Cloud Orchestrator Enterprose Edition Extends Cloud Management Capabilities of IBM Cloud Orchestrator with Integrated Monitoring and Cost Management" dated Dec. 15, 2015, 12 pages.

Jason Edelman's Blog, "OpenConfig, Data Models, and APIs", http://jedelman.com/home/openconfig-data-models-and-apis/, dated Dec. 21, 2015, 15 pages.

Katsaros et al., "Cloud application portability with TOSCA, Chef and Openstack", dated Mar. 2014, 9 pages.

Kontena at Github, "The Automated Container Deployment Pipeline", dated Feb. 9, 2017, 8 pages.

Kouchaksaraei et al., "Joint Orchestration of Cloud-Based Microservices and Virtual Network Functions", dated Jan. 1, 2018, 2 pages.

Alvarez Santiago, "Getting Started with OpenConfig", Cisco, dated 2016, 43 pages.

Kourtis et al., "Intelligent NIC Queue Management in the Dragonet Network Stack", dated 2015, 15 pages.

Yamato et al., "Proposal of Optimum Application Deployment Technology for Heterogeneous IaaS Cloud", Proceedings of 2016 6th International Workshop on Computer Science and Engineering, 4 pages.

NS-3, Network Simulator, "ns-3 Tutorial", ns-3 project, dated Mar. 21, 2018, 127 pages.

Octopus Deploy, "Getting Started" https://octopus.com/docs/getting-started, last viewed on Apr. 17, 2019, 8 pages.

OpenConfig, "Observations on Modelling Configuration and State in YANG", dated Jan. 2018, 17 pages.

Prassanna et al., "A Review of Existing Cloud Automation Tools", dated 2017, 4 pages.

Shalom, Nati, "Orchestration Tool Roundup—Docker Swarm vs. Kubernetes, Terra Form vs. TOSCA/Cloudify vs. Heat", dated Jun. 11, 2015, 9 pages.

Shinde et al., "Intelligent NIC Queue Management in the Dragonet Network Stack", dated 2015, 2 pages.

Sonata, "D7.5 Market Fesibility Study", dated Jan. 5, 2015, 75 pages.

System Evolution, "Borg, Omega, and Kubernetes", dated 2016, 24 pages.

Varma et al., "Comparative Study of Various Platform as a Service Frameworks", International Journal on Cloud Computing: Services and Architecture (IJCCSA) vol. 6, No. 1, Feb. 2016, 12 pages.

Wettinger et al., "Integrating Configuration Management with Model-driven Cloud Management based on TOSCA", dated 2013, 7 pages.

Yamato et al., "Development of Template Management Technology for Easy Deployment of Virtual Resources on OpenStack", Journal of Cloud Computing: Advances, Systems and Applications dated 2014, 12 pgs.

Kouchaksaraei et al., "Pishahang: Joint Orchestration of Network Function Chains and Distributed Cloud Applications", dated 2018, 3 pages.

A.J. Hildebrand, "Combinatorial Probabilities", Math 408, Actuarial Statistics I, dated 2008, 2 pages.

* cited by examiner

RULE BASED CONSISTENCY MANAGEMENT FOR COMPLEX SYSTEMS

BENEFIT CLAIM

This application claims the benefit, as a Continuation, of prior U.S. patent application Ser. No. 14/589,860 entitled "RULE BASED CONTINUOUS DRIFT AND CONSISTENCY MANAGEMENT FOR COMPLEX SYSTEMS", filed Jan. 5, 2015, the entire contents of which are hereby incorporated by reference for all purposes as if fully set forth herein.

CROSS-REFERENCE TO RELATED APPLICATIONS

This application is related to U.S. Appln. No. 62/056,412, filed Sep. 26, 2014, the entire contents of which is hereby incorporated by reference as if fully set forth herein.

TECHNICAL FIELD

The present disclosure relates to managing drift and consistency in complex systems. The disclosure relates more specifically to computer-implemented techniques for maintaining and evaluating rules to detect drift or inconsistencies within a complex system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many datacenters undergo two major types of transformations over time. First, a typical datacenter experiences significant growth with an ever increasing number of software deployments. Second, the software and hardware resources within the datacenter are typically improved or updated with advancements in technology or changes to the underlying deployment models. These transformations may lead to resource deployments that are siloed, dispersed, varied and complex. Some enterprise deployments have thousands of software applications and hardware resources. The ever-increasing and divergent nature of software and hardware deployments within a datacenter may lead to significant challenges in updating and maintaining system resources.

One challenge that datacenter administrators face is maintaining optimal configurations across a large number of software and hardware resources. As resources are updated and improved over time, some targets may begin to drift from business best practice guidelines or other gold standards. For example, some resources may not receive recommended updates or may have updates applied that are not part of the gold standard. Resource drift may cause complex system to function incorrectly or may otherwise adversely affect system functionality and performance. Therefore, administrators are tasked with minimizing and mitigating the effects of resource drift. In large datacenter environments, drift may be particularly difficult for administrators to manage and contain given the number of different resources and configurations.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
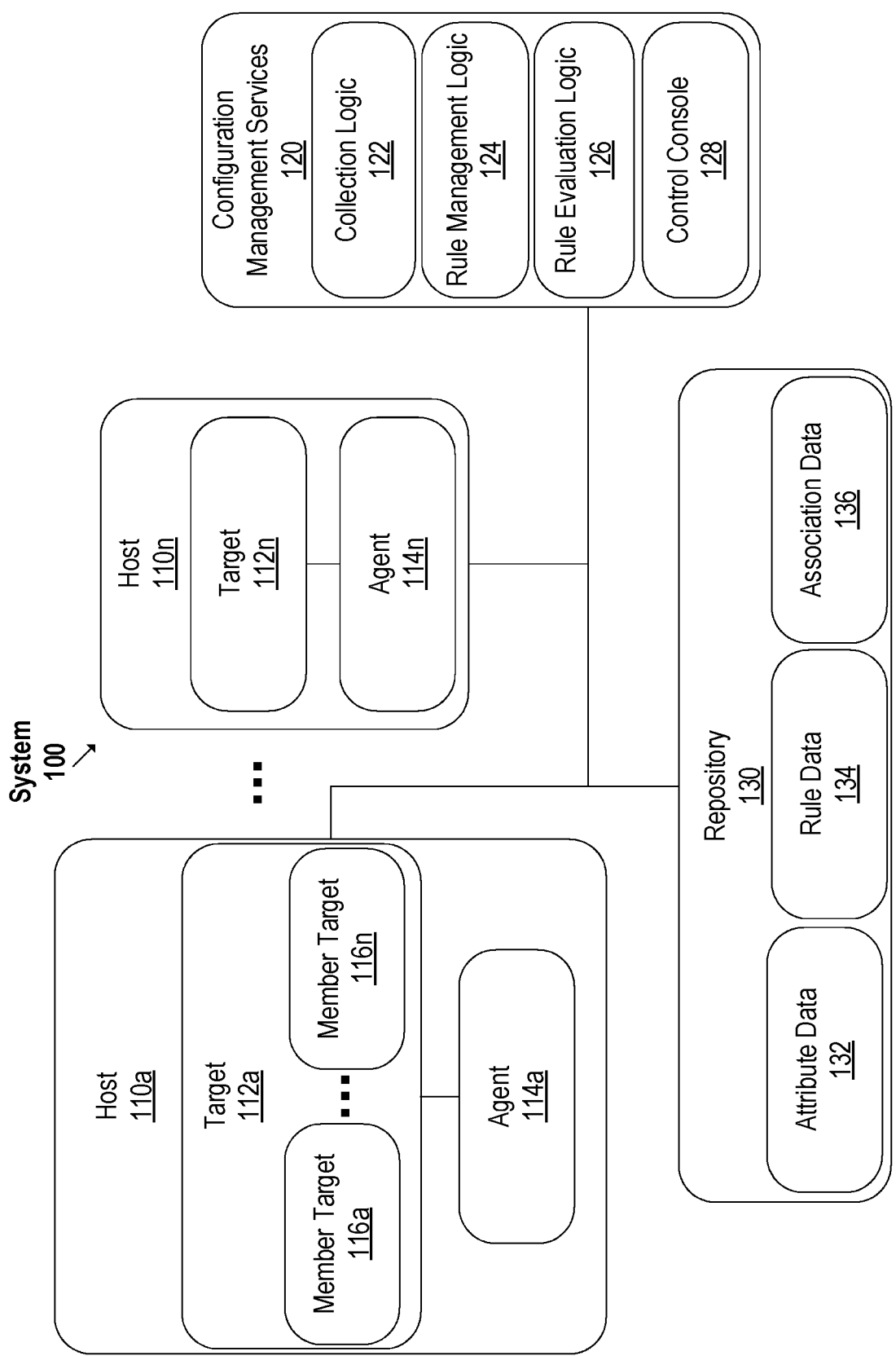
FIG. 1 illustrates an example system for managing drift and consistency within complex systems.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

In various embodiments, computer systems, stored instructions, and technical steps are described for rule-based continuous drift and consistency management for complex systems. Various embodiments provide a flexible and customizable rule-based approach and framework through which drift and/or inconsistency is managed. The rules-based approach provides continuous monitoring of complex systems, allowing users to quickly detect and efficiently manage configuration drift and inconsistency in both small and large-scale environments.

In one embodiment, the rule-based approach includes maintaining a set of one or more drift rules. A drift rule identifies a set of parameters for detecting drift including a set of one or more attributes to compare and a source for comparison. A drift rule is applied to an associated target by comparing a first configuration of the set of one or more attributes on the particular target to a second configuration of the one or more attributes on the source. If the first and the second configurations do not match, then the associated target has drifted from the source. If the first and the second configuration match, then there is no drift with respect to the rule, although drift may be identified by applying other rules as described further below.

In one embodiment, the rule-based approach includes maintaining a set of one or more consistency rules. A consistency rule identifies a set of parameters for detecting whether a composite target is consistent, including a set of one or more attributes to compare between members of the composite target that belong to a same grouping/classification. The attribute configurations of members that belong to the same grouping/classification are compared to determine whether the configurations of any of the members differ. If a difference is detected, then the group is inconsistent. Otherwise, if the configurations are the same, then the groups are consistent with respect to the consistency rule, although the members may be inconsistent with respect to a different consistency rule.

In one embodiment, composite templates are used to specify the attributes to compare for different classifications of member targets within a composite target. The composite template may include a plurality of sub-templates including a first sub-template that identifies a first set of one or more attributes to compare for member targets of a first target type and a second sub-template that identifies a second set of one or more attributes to compare for member target of a second target type. For a composite target that includes a first set of members of the first target type and a second set of members of the second target type, configurations of the first set of one or more attributes on the first set of members may be compared per the first sub-template, and configurations of the second set of one or more attributes on the second set of members may be compared per the second sub-template. If the configurations of the first set of attributes are different between the first set of member targets or configurations of the second set of attributes are different between second set of member targets, then the composite target is not consistent. If the configurations match, then the target may be consistent assuming other consistency groups that belong to the composite target, if any, are also consistent. The composite templates may also be used to detect drift for a composite target, as described further below.

In one embodiment, different rules for application to the same source/target pairing may be assigned different weights for use in determining a compliance score. In another embodiment, the different rules may be assigned the same weights or no weights at all. The compliance score indicates a degree by which a target has drifted, become inconsistent, or remained consistent. If more rules indicate consistency than inconsistency, for example, the compliance score may indicate a lower degree of drift. If more rules indicate inconsistency, on the other hand, then the compliance score may indicate a higher degree of drift.

In some embodiments, notifications are sent to alert a user when configuration drift or inconsistency is detected. Timely notifications may allow the user to take corrective actions or otherwise address configuration issues before system functionality and performance is adversely affect. The notifications may include a compliance score and/or other information that may be useful for the user to take corrective action.

Drift and Consistency Management System

FIG. 1 illustrates an example system for managing drift and consistency within complex systems. System 100 generally comprises hosts 110a to 110n, configuration management services 120, and repository 130. Components of system 100 may be implemented in one or more datacenters, one or more clouds, and/or one or more other networked environments.

Hosts 110a to 110n represent a set of one or more network hosts and generally comprise targets 112a to 112n and agents 114a to 114n. Hosts 110a to 110n are communicatively coupled with configuration management services 120 and may send/receive messages according to one or more communication protocols. Example communication protocols that may be implemented include, without limitation, the hypertext transfer protocol (HTTP), secure shell (SSH), and/or other communication protocols of the internet protocol suite.

A "target" or "target system" in this context refers to a particular hardware resource, software resource, or some combination thereof. A target may include a host machine itself, a set of one or more hardware components on the host machine, and/or a set of one or more software resources running on the host machine. As an example, a target may be a particular software deployment such as a set of one or more database systems, middleware applications, operating systems, virtual machine components, software registered with an operating system, or some other software application or set of software applications. In another example, a target may comprise hardware infrastructure components such as a set of one or more network switches, storage appliances, routers, ports, processors, or some other device within a network topology.

A target may comprise a number of related targets that are managed as a group. A target that is composed of a number of other related targets is hereby referred to as a "composite target." A target that is part of the group that forms a composite target is hereby referred to as a "child" or "sub-target" of the composite target and as a "member target" within the group. With reference to FIG. 1, target 112a is a composite target that includes member targets 116a to 116n. Each of member targets 116a to 116n are managed as part of the same group corresponding to target 112a and are children of target 112a. For example, target 112a may correspond to a group of related software applications, such as middleware or database system software, and each of member targets 116a to 116n may correspond to individual software applications or other sub-components that are part of the target system. As another example, target 112a may correspond to a redundancy group or a cluster software group, where member targets 116a to 116n are a series of related targets that are managed as a single composite entity. Although member targets 116a to 116n are depicted as residing on the same host, the member targets may reside on different host machines. Each individual member target may also be managed separately in addition to being managed as part of the group corresponding to target 112a.

A member target may be a composite target, with multiple children targets. For example, one or more of member targets 116a to 116n may be a composite target composed of multiple sub-targets (not shown). Thus, composite target 112a may comprise a hierarchical set of member targets that may include children, grandchildren, and so on.

Agents 114a to 114n periodically or continuously send data, collected from targets 112a to 112n and member targets 116a to 116n, to configuration management services 120. The data collected by agents 114a to 114n may generally comprise attribute data that identifies the current configuration state of the corresponding targets. Example attribute data that may be collected may include, without limitation:

Hardware configuration information such as details about the memory, storage, processor, port configurations, and network topology of a target; and/or Software configuration information such as the name, version, installed patches/patch sets, initialization parameters, software instance properties, licensing information, and other characteristics of a target.

Each agent is a set of one or more processes, such as a service or daemon, that executes on the corresponding host machine and monitors a corresponding target or set of targets. The agents may be components of a management system such as a network management system (NMS) or enterprise management system (EMS).

Although only one target and one agent is illustrated per host, the number of targets and agents per host may vary from implementation to implementation. For example, multiple targets and/or agents may be deployed on a single host. Furthermore, in a clustered environment, a single target may logically be spread across a plurality of hosts. As an example, a target may comprise a cloud database, with multiple sub-target database nodes spanning more than one compute node, with each database node running a database server having the same configuration.

Configuration management services 120 generally comprise collection logic 122, rule management logic 124, rule evaluation logic 126, and control console 128. Each of these logic units is configured to perform a distinct set of functions with respect to drift and consistency management. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discrete logic (e.g, ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Collection logic 122 is configured to receive attribute data from agents 114a to 114n and to store the collected in repository 130. Collection logic 122 may collect data on a continuous or periodic basis. As an example, one or more of agents 114a to 114n may send updated attribute data to collection logic 122 in response to detecting that configuration information has changed. As another example, one or more of agents 114a to 114n may send configuration profiles each night or on some other periodic basis.

Rule management logic 124 includes logic for managing drift and/or consistency rules. For example, rule management logic 124 may be configured to generate and store rule data 134 in repository 130, associate targets to rules, maintain group based associations between targets and rules, and/or trigger rule evaluation with respect to one or more targets. Techniques for managing drift and consistency rules are described in further detail in the sections below.

Rule evaluation logic 126 includes logic for evaluating drift and/or consistency rules. Rule evaluation logic 126 may further be configured to generate notification data to indicate a result of a rule evaluation. The rule evaluation results and notification data may be stored in repository 130, sent over a network, displayed to a user via control console 128, and/or otherwise output. Techniques for evaluating drift and consistency rules and generating notification data are described in further detail in the sections below.

Control console 128 provides a user interface that allows a user to monitor and administer, locally or from a remote network location, the drift and consistency management processes described herein. The user interface may comprise, without limitation, a graphical user interface (GUI), an application programming interface (API), a command-line interface (CLI) or some other means of interacting with a user. A "user" in this context may include, without limitation, an application or a human user such as a system administrator.

Repository 130 comprises computer data storage that stores data for configuration management services 120. For example, repository may include, without limitation, a set of one or more disks, memories, storage appliances, storage servers, databases, and/or other non-transitory volatile or non-volatile storage mediums. Repository 130 stores data that is used by configuration management services 120 including, without limitation, attribute data 132, rule data 134, and association data 136.

Attribute data 132 stores configuration attribute values collected from targets 112a to 112n. As an example, for a target software resource, attribute data 132 may store the name, version, installed patches and patch sets, initialization parameters, software instance properties, licensing information, and/or other values that identify the current configuration of the target resource. The stored set of configuration attributes for a given target is referred to herein as a "configuration profile" of the target. Attribute data 132 may map the targets (e.g., using a target identifier) to their corresponding configuration profiles.

Rule data 134 stores drift rules and/or consistency rules. A "drift rule" in this context refers to a set of data that controls how drift is detected. A "consistency rule" refers to a set of data that controls how consistency is detected. Examples of drift and consistency rules are given in the sections below.

Association data 136 stores mappings between targets and rules. For example, association data may map a target identifier, such as a target name or other data that uniquely identifies a respective target, to one or more rule identifiers that uniquely identify a set of one or more respective rules with which the respective target is associated.

Drift Rule Management

In one embodiment, rule management logic 124 maintains a set of one or more drift rules. Generally, drift rule data identifies a set of one or more attributes to compare and a source with respect to which the attribute comparison is performed. The "source" identified by the drift rule may correspond to a particular golden target or saved configuration profile, as described in further detail in the section below, and represents a standard or recommended level of configuration (also referred to as a "gold standard"). A target drifts from the source if the set of configuration attributes at the target are configured differently (e.g., have different attribute values) than the set of configuration attributes at the source.

The set of attributes that are identified by a particular rule may vary from implementation to implementation and between different drift rules. As an example, different rules may be used to capture different standards. A first rule may be defined for a first standard that specifies a first set of attributes to compare and a first source. A second rule may then be defined for a second standard. The second rule may differ from the first rule in the following respects:

Different attribute set and same source. In this scenario, the second rule specifies a different set of attributes than the first rule but uses the same source as the first rule. For example, the first rule's set of attributes may include license information and the second rule's set of attributes may omit this from the attributes to compare and/or include additional attributes not specified by the first rule.

Same attribute set and different source. In this scenario, the second rule specifies the same set of attributes to compare as the first rule but compares the attributes to a different source. The different source may be configured differently than the first source. For example, the second source may have a different level of patches or other updates applied.

Different attribute set and different source. In this scenario, the second rule specifies a different set of attributes and a different source than the first rule.

Configuration attributes that are not specified in the rule are not compared when the rule is evaluated. A configuration profile for a target may include hundreds or even thousands of different configuration attributes. Some of the configuration attributes may not be useful in the determination of whether the target has drifted from business best practice guidelines or some other standard. For example, the host on which a target is installed may be expected to vary from target to target in some implementations and does not necessarily imply that there is drift. By specifying which set of attributes to compare, the rule allows for a subset of pertinent configuration attributes to be captured for drift comparisons and for non-relevant configuration attributes to be ignored.

Configuration Templates

In one embodiment, a configuration template is used to store data that identifies a set of attributes. A configuration template is associated with a respective rule to capture a list of configuration attributes to compare for the respective rule. The configuration template may be associated with a single rule or with multiple rules. For example, a particular configuration template may be created for a first rule to capture the set of attributes to compare with a first source. The particular configuration template may then be used with a second rule to compare the same set of attributes to a second source.

A composite template may be used to capture the configuration attributes for a set of one or more corresponding composite targets. A "composite template" in this context refers to a configuration template that is composed of a plurality of sub-templates. The composite template may comprise a root template corresponding to the composite target, and a plurality of sub-templates, with each sub-template capturing configuration attributes to compare for a corresponding class of targets.

The hierarchical structure of the composite template may be based on hierarchical structure of a composite target. For a composite target that has multiple member of different target types, a corresponding composite target may include sub-templates for each member target type, according to an embodiment. A "target type" in this context refers to a target classification and may also be referred to herein as a "target classification". The manner in which a target is classified may vary from implementation to implementation. In one embodiment, the classification is made based on a set of characteristics associated with the target. As an example, a target type for a particular software resource may be classified according to a product name and release date, such as an Oracle® database target type. As another example, a target type may be classified according to the type of a function performed by the target. Continuing with the present example, HTTP servers may be associated with a first target type, database a second target type, middleware a third target type and so on. Other examples of target types include, without limitation, high availability service, a database service, a database machine, an application service, a domain discovery service, and user-defined target types. Each of these target types may be associated with a different sub-template to capture configuration attributes for corresponding targets that match the target type. Thus, HTTP servers may be associated with a first sub-template capturing a first set of configuration attributes to compare for members matching this target type, database systems may be associated with a different sub-template capturing a different set of configuration attributes to compare, and so on.

Figure 2:
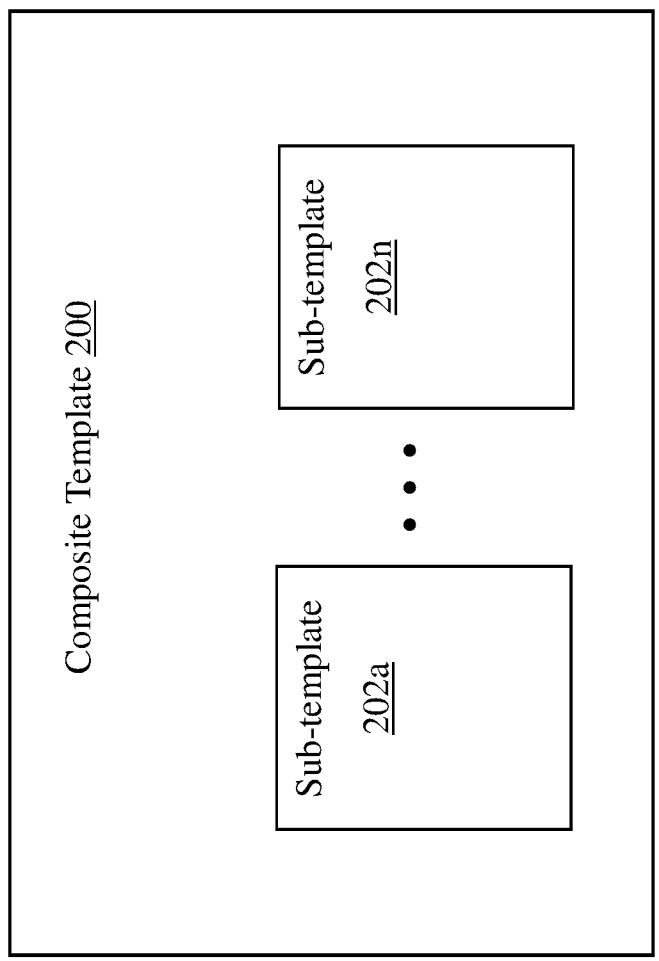
FIG. 2 illustrates updates to an end state definition and corresponding gold image as patches are released over time.

FIG. 2 is a block diagram depicting an example composite template, according to an embodiment. Composite template 200 is the root template and includes sub-templates 202*a* to 202*n*. Each of sub-templates 202*a* to 202*n* may include a distinct configuration template. For example, sub-template 202*a* includes configuration template 204*a*, and sub-template 202*n* includes configuration template 204*n*. Although not illustrated, one or more of templates 202*a* to 202*n* may also be a composite template with multiple other sub-templates that have distinct configuration profiles. Thus, composite template 200 provides a hierarchical organization for comparing drift or consistency within complex systems.

Source Identification

As previously indicated, the source that is identified by a drift rule represents the business best practice guidelines or recommended standard level of configuration. In order to identify the source, rule data 134 stores source identification data that identifies the source for each respective rule. The source that is associated with a rule may vary from implementation to implementation and may include, without limitation:

A target with a gold configuration;

A gold configuration saved snapshot; and/or

A baseline configuration snapshot for a target at a previous point in time when the target was functioning correctly.

Source identification information that represents a target with a gold configuration (herein referred to as the "gold target") may generally comprise a target identifier (e.g., name, path, etc.) for the gold target and/or a configuration profile for the current configuration attribute values of the gold target. When the gold target is used as a source, the current configuration state of the gold target is captured and used to detect drift. As attribute values at the gold target are changed, the standard for detecting drift also changes. For example, a new patch that is applied at the gold target corresponds to an update in the gold standard such that the updated gold standard includes the new patch. During drift rule evaluation, a target is compared against the current state of the gold target to detect drift. If a target does not include the new patch, then the target may be identified as having drifted from the source. Any of targets 112*a* to 112*n* may be selected and used as a gold target source.

Source identification information that represents a gold configuration saved snapshot may generally comprise a snapshot identifier (e.g., name and path) for a saved configuration snapshot file and/or a configuration profile with the saved attribute values that are part of the configuration snapshot. The gold configuration saved snapshot differs from the gold target in that the corresponding standard may or may not represent the latest state of a gold target and does not automatically change as a gold target's attributes are updated. The gold configuration saved snapshot may be created manually by a user (e.g., the user may input the attribute values through control console 128) or may be created by saving the configuration profile from one of targets 112*a* to 112*n*.

Source identification information that represents a baseline configuration snapshot for a target may generally comprise a snapshot identifier for a configuration snapshot file and/or a configuration profile with saved attribute values that were collected from a target at a previous point in time when the target was functioning correctly. The baseline configuration snapshot allows an administrator to determine how a target has drifted with respect to the target's own baseline configuration. As an example, a baseline snapshot of a target may be taken at time T1. Subsequently, different patches may be installed as a target evolves over days, months or even years. At a later point in time T2, two or more patches may have been installed on the target that do not work in conjunction with each other. The target may be compared against the baseline snapshot to determine that the target has drifted from the baseline snapshot and how the target has drifted from the baseline snapshot.

Drift Rule Evaluation

In one embodiment, rule evaluation logic 126 is configured to apply drift rules to determine whether targets have drifted from a source. A target to which a rule is applied is referred to herein as a "destination target". To apply a particular drift rule to a destination target, rule evaluation logic 126 compares the destination target with the rule's source as per the configuration attributes specified in the rule's configuration template. Drift is detected if any attribute value for a relevant attribute at the destination target differs from the corresponding value at the source. "Relevant" in this context refers to an attribute value that is specified by the rule (e.g., in a configuration template) and compared during rule evaluation.

For a target that has drifted, rule evaluation logic 126 may maintain data that indicates how the target has drifted from the source. In one embodiment, rule evaluation logic 126 maintains a list of differences between the target and source. For each attribute value of the target that differs from the corresponding value in the source, rule evaluation logic 126 adds an entry to the list of differences that identifies the differing attribute. Thus, the list of differences may be used to determine how many and which attributes differ between a source and a target that has drifted.

In one embodiment, rule evaluation logic 126 computes a compliance score for a target when a drift rule is applied to the respective target. The compliance score may be computed and assigned to the target as follows:

$$C = 100\% \times \left(1 - \frac{\text{total number of configuration items in template that are different}}{\text{total number of configuration items compared as per the template}}\right) \quad \text{(Eq. 1)}$$

where C represents the compliance score assigned to the destination target per the applied rule. If the compliance score is 100% for a rule/target then the target is not drifted. A compliance score of less than 100% means that the associated target has drifted from the golden source configuration.

Figure 3:
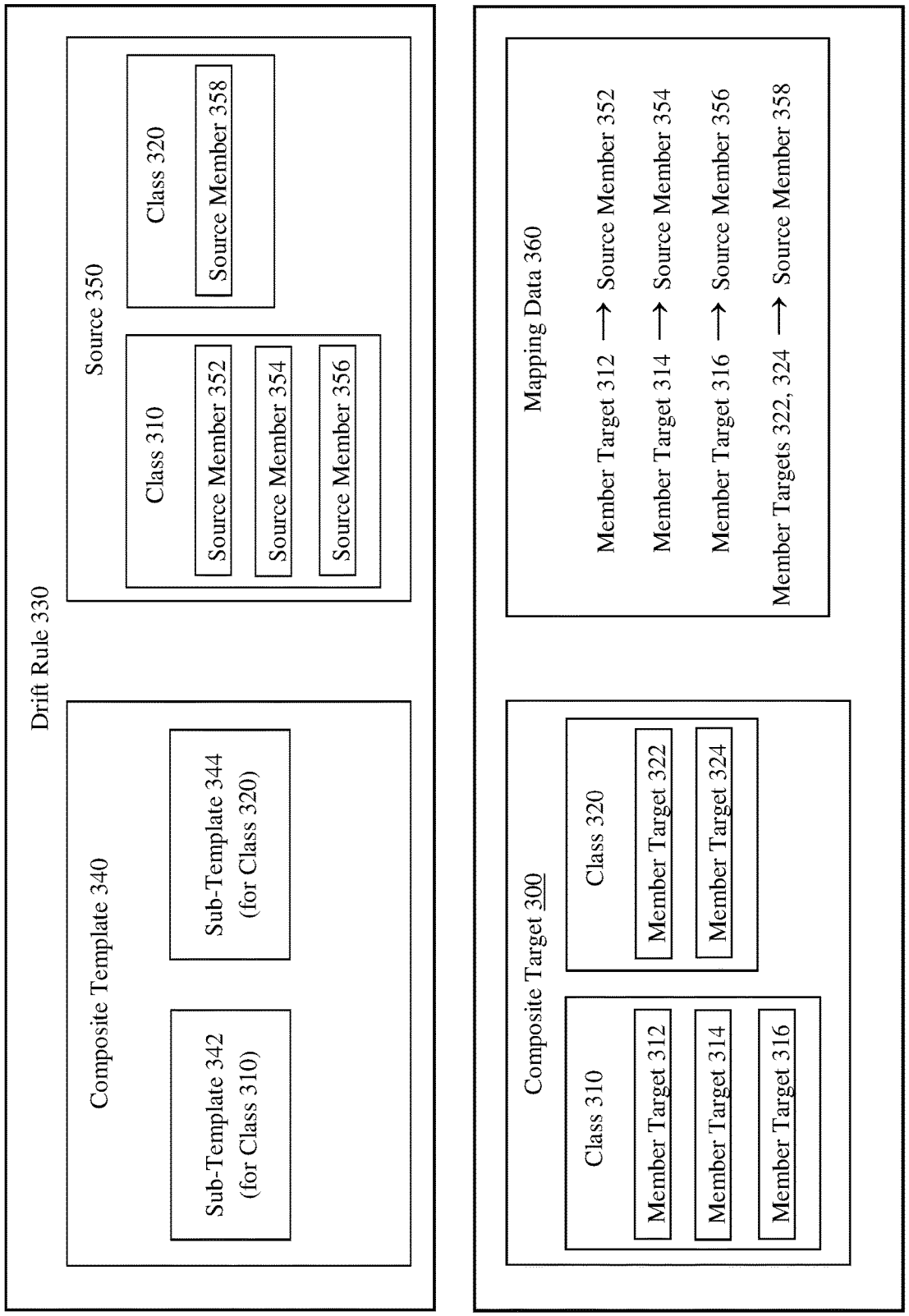
FIG. 3 illustrates targets that subscribe to an image and follow the updates to the latest versions available.

If the destination target is a composite target, then mapping data may be maintained that specifies which member of the source maps to which member of the destination target. The mapping may be one-to-one where one member target within the destination target maps to one source members, or many-to-one where multiple member targets within the destination target map to a single source member. FIG. 3 illustrates an example mapping between members of a composite target and members of a source golden configuration. Composite target 300 includes member targets 312, 314, and 316, which belong to target class 310 and member targets 322 and 324, which belong to target class 320.

Drift rule 330 includes or is otherwise associated with composite template 340 and source 350. Composite template includes sub-template 342, which specifies configuration attributes to compare for member targets of target class 310, and sub-template 344, which specifies configuration attributes to compare for member targets of target class 320. Source 350 specifies golden configuration information for source members 352, 354, and 356, which belong to target class 310, and source member 362, which belongs to target class 320. To determine which golden configuration information should be applied to which member target, mapping data 360 is maintained.

During rule evaluation, the configuration of relevant attributes (those specified in sub-template 342) on member target 312 are compared to golden configuration information maintained for source member 352. Similarly, the configuration of the relevant attributes on member target 314 are compared to golden configuration information maintained for source member 354, and the configuration of the relevant attributes on member target 316 are compared to golden configuration information maintained for source member 356. Thus, different standards may be maintained for different member targets. The configuration of member targets 322 and 324 are both compared to golden configuration information maintained for source member 362 for the configuration attributes identified by sub-template 344.

The compliance score for a composite target may be computed and assigned to a destination target as follows:

$$C = 100\% \times \left(1 - \frac{\begin{array}{c}\text{total number of configuration items across}\\ \text{all members that are compared as per}\\ \text{the map that are different/drifted}\end{array}}{\begin{array}{c}\text{total number of configuration items across}\\ \text{all members that are compared as}\\ \text{per the map and the template}\end{array}}\right). \quad \text{(Eq. 2)}$$

A compliance percentage of less than 100% means that the target has drifted from the golden source configuration with respect to one or more attribute values of one or more member targets.

Configuration attributes that are not specified in a drift rule are ignored during drift evaluation. As an example, a particular drift rule may be associated with a configuration template that lists installed patches as a relevant configuration attribute but does not list initialization parameters. During rule evaluation, the installed patches between the destination and the source are compared, but the initialization parameters are not compared. Thus, if the configuration of installed patches between a source and a destination are different, then the destination target has drifted, and the compliance score will be less than 100%. However, if the initialization parameters in the present example differ, there is no effect on the compliance score since these parameters are not compared. Even if the initialization parameters differ, the destination target may not have drifted if the configuration attributes listed by the configuration template are the same between the source and destination.

Consistency Rules

In one embodiment, rule management logic 124 maintains a set of one or more consistency rules. Similar to drift rules, consistency rules include data that identifies what attributes to compare. However, unlike drift rules, consistency rules do not specify a source for comparison since consistency evaluation does not involve inter-target comparisons between a golden target and a destination target. Rather, consistency evaluation involves intra-target comparisons where the configurations of member targets are of the same target type (i.e. target classification) and that are descendants (e.g. children, grandchildren, and so on) of the same root target are compared for consistency.

A consistency rule captures the attributes for comparison on a per consistency group basis. A "consistency group" in this context refers to a group of member targets that are checked for consistency by an associated consistency rule. As an example, a root target may comprise a cluster group of database server instances and/or a redundancy group of storage appliances. The cluster and redundancy group in the preceding example correspond to different consistency groups, and the database server instances and storage appliances correspond to the member targets of the respective consistency groups. A root target may have one or more consistency groups.

The set of attributes that are identified by a particular consistency rule may vary between different consistency rules. For instance, different rules and corresponding standards may be used for different geographic locations, different lines of business, or different target types. Example configuration attributes that may be captured by a consistency rules may include the same attributes listed above with respect to drift rules.

In one embodiment, a consistency rule is associated with a composite template, where the composite template captures the list of configuration attributes to compare for one or more consistency groups. Given that a root target has multiple member targets to compare for consistency, the root target is a composite system. The composite templates described above may thus be used to determine which attributes to compare for a given consistency group. Consistency groups that belong to the same root target may have different configuration templates, resulting in different configuration attributes being used to determine consistency for each group. With reference to FIG. 2, each of sub-templates 202a to 202n may capture a different set of configuration attributes for a respective consistency group.

In one embodiment, consistency groups within a composite target correspond to different member target types. As an example, a first consistency group may comprise member targets of a first type (e.g., database nodes), a second consistency group may comprise member targets of a second target type (e.g., middleware nodes), and so on.

In one embodiment, each consistency group is associated with a reference target. A "reference target" in this context is used as a source to perform comparisons with each of the other targets in the group. When the consistency groups correspond to different member target types, the reference target is specified on a per target type basis. The reference target for a group may be selected by a user or may be automatically selected by rule management logic 124.

Consistency Rule Evaluation

In one embodiment, rule evaluation logic 126 is configured to apply consistency rules to determine whether a composite target has any inconsistencies. To apply a particular consistency rule to a destination target, rule evaluation logic 126 compares the configuration of relevant attributes (as per the configuration attributes specified in the corresponding sub-template within the rule) on the reference target with the configuration of the relevant attributes on members that belong to the same consistency group. This process may be repeated for each consistency group within the composite target. A target is inconsistent if a relevant attribute value of the reference target differs from a corresponding value of another member of the same consistency group.

For a target that has become inconsistent, rule evaluation logic 126 may maintain data that indicates where the target has become inconsistent and to what degree the target has become inconsistent. In one embodiment, rule evaluation logic 126 maintains a list of configuration attributes that are inconsistent. When a composite target is associated to the consistency rule, rule evaluation logic 126 compares the members of the composite target of same target type, as per the sub-template with respect to the reference target per member target type. If any of the members configuration attributes of certain sub target type is different from other members or the reference member, then a difference is registered and the configuration attribute is added to the list of inconsistent attributes.

In one embodiment, rule evaluation logic 126 computes a compliance score for a target when a consistency rule is applied to the respective target. The compliance score may be computed and assigned to the target as follows:

$$C = 100\% \times \left(1 - \frac{\text{total number of configuration items that are different across all members that are compared as per the comparisons of members with reference target per member target type}}{\text{total number of configuration items across all members that are compared as per the comparisons of members with reference target per member target type}}\right) \quad \text{(Eq. 3)}$$

where C represents the compliance score assigned to the destination target per the applied consistency rule. If the compliance score is 100% for a rule/target then the target is consistent. A compliance score of less than 100% means that the associated target has one or more members that have become inconsistent.

The compliance score for a target may take into account multiple consistency groups that belong to the same target. As an example, a composite target may have the following consistency groups:

Group 1 having the following members with target type MT1: target M11 (reference target), M12, and M13; and Group 2 having the following members with target type MT2: target M21, M22 (reference target), and M23.

During rule evaluation, M11 is compared with M12 and M13 and M22 is compared with M21 and M23. In the present example, it is assumed that one configuration attribute out of five configuration attributes compared is different between M11 and M12, and no configuration attributes are different out of the five configuration attributes compared between M11 and M13. It is further assumed that three configuration attributes different out of five configuration attributes compared between M22 and M21, and two configuration attributes are different out of five configuration attributes compared between M22 and M23. Based on the foregoing assumptions and Eq. 3, the compliance score is computed as follows:

$$C = 100\% \times \left(1 - \frac{(1+0+3+2)}{(5+5+5+5)}\right) = 70\%$$

Evaluation Result Notification

In one embodiment, rule evaluation logic 126 generates notifications upon detecting drift or inconsistencies. The notification data may generally comprise evaluation results for a drift rule and/or consistency rule evaluation that alerts an administrator or other user of a detected drift or inconsistency. For example, a notification may comprise the evaluation result generated in response to applying a drift or consistency rule to a target. The evaluation result may include, without limitation data that identifies:

A compliance score that indicates the degree by which a target has drifted from a source;

A compliance score that indicates the degree by which a target has become inconsistent;

The total number of attributes that have drifted;

The total number of attributes that have become inconsistent;

A list of one or more attributes that have drifted from a source; and/or

A list of one or more attributes that have become inconsistent;

Recommended corrective actions.

Once generated, rule evaluation logic 126 outputs the notification data to the user. The manner in which the notification data is output may vary from implementation to implementation and may include, without limitation, sending the notification via email to a registered email address, storing the notification data in repository 130, transmitting the notification over a computer data network, and/or causing display of the notification data through a user interface such as control console 128.

Group-Based Associations

In one embodiment, association data 136 maintains mappings between groups of targets and respective rules. When a rule is associated with a group of targets, rule evaluation logic 126 applies the rule across the targets that belong to the group. Target grouping allows drift and consistency standards to be defined once and applied across multiple targets. A "group" or "policy group" in this context differs from the consistency groups discussed above in that that targets of a policy group may include targets that do not belong to the same composite target.

The targets may be grouped into policy groups according to one or more grouping criteria. Example grouping criteria may include, without limitation, target location, line of business, lifecycle status, and/or one or more other target characteristics. As an example, targets that belong to a datacenter at a first geographic location may be grouped separately and associated with a different rule than targets that belong to a datacenter at a different geographic location. This grouping allows different standards to be maintained on a per-location basis. As another example, targets that belong to a first line of business (e.g., finance) may be grouped and associated with a different rule than targets that belong to a second line of business (e.g., sales.) As another example, targets that have a first lifecycle status (e.g., production targets) may be grouped separately and associated with a different rule than targets that have a second lifecycle status (e.g., test targets).

In one embodiment, multiple rules may be associated with a particular group or target. When a group is associated with two or more drift rules, each drift rule may have a different configuration template and/or a different source. Similarly, when a group is associated with two or more consistency rules, each consistency rule may have a different configuration template. A particular group or target may be also associated with both a drift rule and a consistency rule. By allowing multiple rules to be mapped, a group may be managed according to multiple policies and standards.

In one embodiment, a target may be associated with multiple policy groups. For example, the target may belong to a first policy group that is grouped based on geographic location and a second policy group that is grouped based on line-of-business or some other grouping criteria. By allowing a target to be mapped to multiple groups, the target may be managed according to multiple group policies/standards.

A target that is associated with multiple rules, either by virtue of belonging to multiple policy groups or belonging to a group associated with multiple rules, may drift or become inconsistent with respect to one associated standard without drifting or becoming inconsistent with respect to another associated standard. In other words, evaluation of a first rule applied to a target may yield a compliance ratio of 100% while evaluation of a second rule may yield a compliance ratio of less than 100%. In other instances, the target may be 100% compliant with a plurality of rules or non-compliant with all associated rules.

Group Management According to Target Type

In one embodiment, policy groups maintain a set of rules that are associated with different member types. For example a particular policy group may include first drift rule that is associated with a first target type (e.g., databases), a second drift rule that is associated with a second target type (e.g., middleware) and so on. Rule evaluation logic 126 then selects which rule or set of rules to apply to a target within the group based on the target type. Continuing with the previous example, rule evaluation logic 126 would apply the first drift rule to targets of the first target type and the second drift rule to targets of the second target type.

When a new target is added to or otherwise becomes part of a group, the rules that are associated with a group are automatically associated with the new target. In addition, rule evaluation logic 126 automatically evaluates the new target against the drift/consistency rules that are associated with the group. If the new target is inconsistent or drifts from the recommend gold standard, rule evaluation logic 126 may generate and send a notification to an administrator. When a target is removed from the group, the association and evaluation results for the corresponding drift/consistency rules are also removed for that target.

A target may be dynamically or manually added to a group, depending on the particular implementation. Dynamic addition may be performed automatically based on the configuration profile of a target. As an example, a new target may be added to a datacenter at a particular geographic location for a particular line of business. Rule management logic 124 may analyze such properties in the configuration profile of the new target to determine with which groups the new target should be associated. Continuing with the previous example, rule management logic 124 may assign the new target to a first group of targets that share the same geographic location and a second group of targets that share the same line of business. Rule evaluation logic 126 may then apply the associated rules for these groups to the new target.

Continuous Change-Driven Monitoring

Configuration management services 120 may provide continuous drift monitoring with respect to targets 112*a* to 112*n*. When a configuration attribute is modified for a target or a drift rule source, rule management logic 124 triggers rule re-evaluation for an associated rule if any of the configuration attributes specified in the modified configuration attribute is specified in the rule's configuration template. If the result of the comparison is different from the previous rule evaluation, then the compliance score is recomputed, and a notification is sent with the difference report. The difference report may identify the configuration attribute that has drifted and a previous value of the attribute in the target and/or source.

In addition or alternatively, configuration management services 120 may provide continuous consistency monitoring with respect to targets 112*a* to 112*n*. When a configuration attribute of a member target is modified that matches a configuration attribute as per any sub-template inside the composite template, the member target is compared with the corresponding reference target within the composite target, and if the number of configuration differences changes, then the compliance score is modified. If compliance score is <100%, then a notification is sent to the administrator or other user. If the compliance score is 100%, and previously it was <100%, then a notification may be sent to confirm the previously reported inconsistency is fixed/resolved. When a new member target is added/removed to/from a composite target then the member's configuration attributes are compared with the corresponding reference target, as per the member template within the composite template of the consistency rule and rule/composite target compliance score, and difference result is recomputed and regenerated for the affected targets.

In one embodiment, rule-target associations are used to determine which targets to apply a rule to in response to detecting a change. The following scenarios may trigger application of a rule to one or more targets that are associated with a respective rule:

When the underlying configuration template is modified on which a respective rule depends, the respective rule is reevaluated for the associated targets;

When a source target is modified for a respective drift rule, the respective drift rule is reevaluated for the associated targets;

When a source target's configuration data is modified on which a respective drift rule depends, the respective rule is reevaluated across the associated targets;

When a destination target's configuration data is changed, respective drift/consistency rule(s) which are associated with the destination target and whose template depends on the configuration data that was modified are reevaluated for the destination target;

When a member target is added to a composite target which is associated to a respective consistency rule, then the consistency rule is reevaluated for that associated composite (root) target; and/or When a member target is removed to a composite target which is associated to a respective consistency rule, then the respective consistency rule is reevaluated for the associated composite target.

Figure 4:
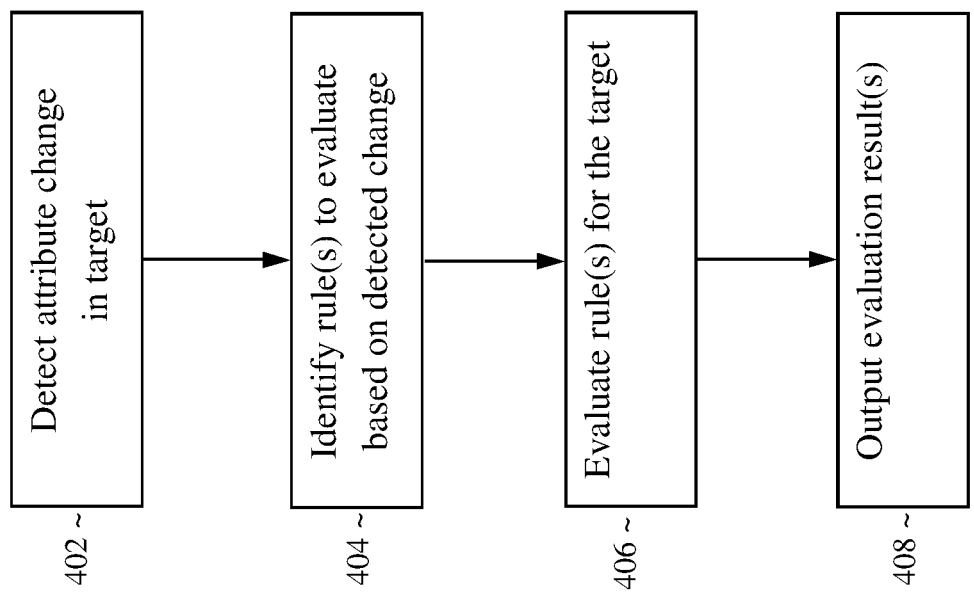
FIG. 4 illustrates an example process for continuous monitoring of drift and consistency in a system comprising a plurality of targets.

FIG. 4 is a block diagram depicting an example process for continuous monitoring of drift and consistency in a system comprising a plurality of targets. At block 402, a change in a configuration attribute is detected. The change may be to one of targets 112a to 112n or to a golden source information file. Rule management logic 124 may monitor data collected by collection logic 122 and the golden source information associated with the set of rules in order to detect the change.

In response to detecting the change, at block 404, rule management logic 124 identifies and reads a set of one or more rules to evaluate based on the change. The set of rules identified at this step comprise rules that are associated with the target or source that had the attribute changed and that include the changed attribute in the configuration template. For example, if an initialization parameter was changed on a target, then rule management logic 124 may search for all drift and/or consistency rules that are mapped to the target (or group to which the target belongs) and that include the initialization parameter as a configuration attribute. If the changed attribute is not included in any rules associated with the target, then the process may end without execution of the following steps.

At block 406, rule evaluation logic 126 evaluates the set of one or more rules to determine whether any drift or inconsistency has resulted from the attribute change. Rule evaluation logic 126 may determine a compliance percentage and which attributes, if any, have drifted or become inconsistent as described above.

At block 408, rule evaluation logic 126 outputs one or more sets of evaluation results generated based on the rule evaluation at block 406. As previously indicate, outputting the set of evaluation results may comprise sending a notification to an administrator, storing the result set in repository 130 and so on.

Rule Modelling and Customization

In one embodiment, rule management logic 124 allows users to create, edit, and/or otherwise customize drift rules. For example, the user may define and modify the set of configuration attributes, source, and member-target to source-member mappings for a drift rule. Similarly, the user may define and modify the set of configuration attributes and reference target(s) for a consistency rule. By allowing users to create and modify drift rules, configuration management services 120 provide a flexible and editable platform through which the user may manage drift and inconsistency with respect to targets 112a to 112n. The platform further allows the user to efficiently define and customize standards via the rules and to monitor targets 112a to 112n with respect to those standards.

Figure 5:
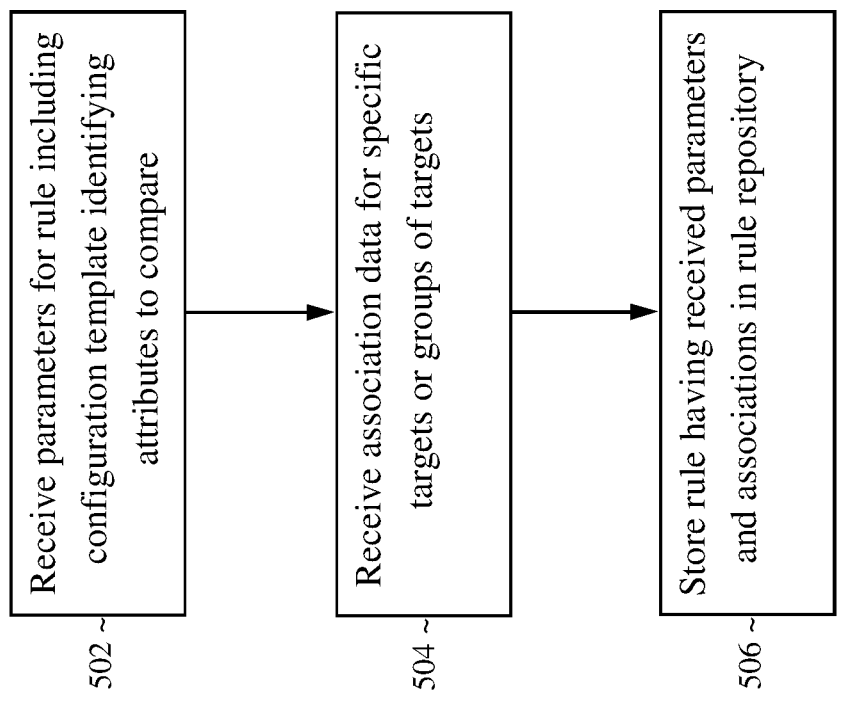
FIG. 5 illustrates an example process for generating drift rules.

FIG. 5 is a flowchart depicting an example process for generating drift rules. At block 502, rule management logic 124 receives, from a user, a set of parameters for a new rule. The parameters may include a configuration template, source, and/or mapping data between member targets and source members (for composite targets) if the new rule is a drift rule. For a consistency rule, the parameters received at this step may include a configuration template and a reference target. The user may specify the type of rule (drift/consistency) they would like to as part of a request to rule management services 120 to create a new rule.

At block 504, rule management logic 124 receives, from the user, association data for the new rule. The association data indicates to which target or group of targets the rule is mapped and should be applied. The rule may be mapped to a single target, a group of targets, or multiple groups of targets.

At block 506 rule management logic 124 stores the new rule, including the received parameter values, and the association data in repository 130. Rule evaluation logic 126 may then apply the rule to the associated target(s) or group(s) to determine whether the associated target(s) are drifted from a gold standard or are inconsistent.

After a rule has been stored at block 506, a user may subsequently edit the parameters within the rule. For example, the user may add or remove configuration attributes from the configuration profile, change the source/reference target, or modify the targets or groups with which the rule is associated. In response to a rule modification, rule evaluation logic 126 may reapply the updated rule to the associated targets.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
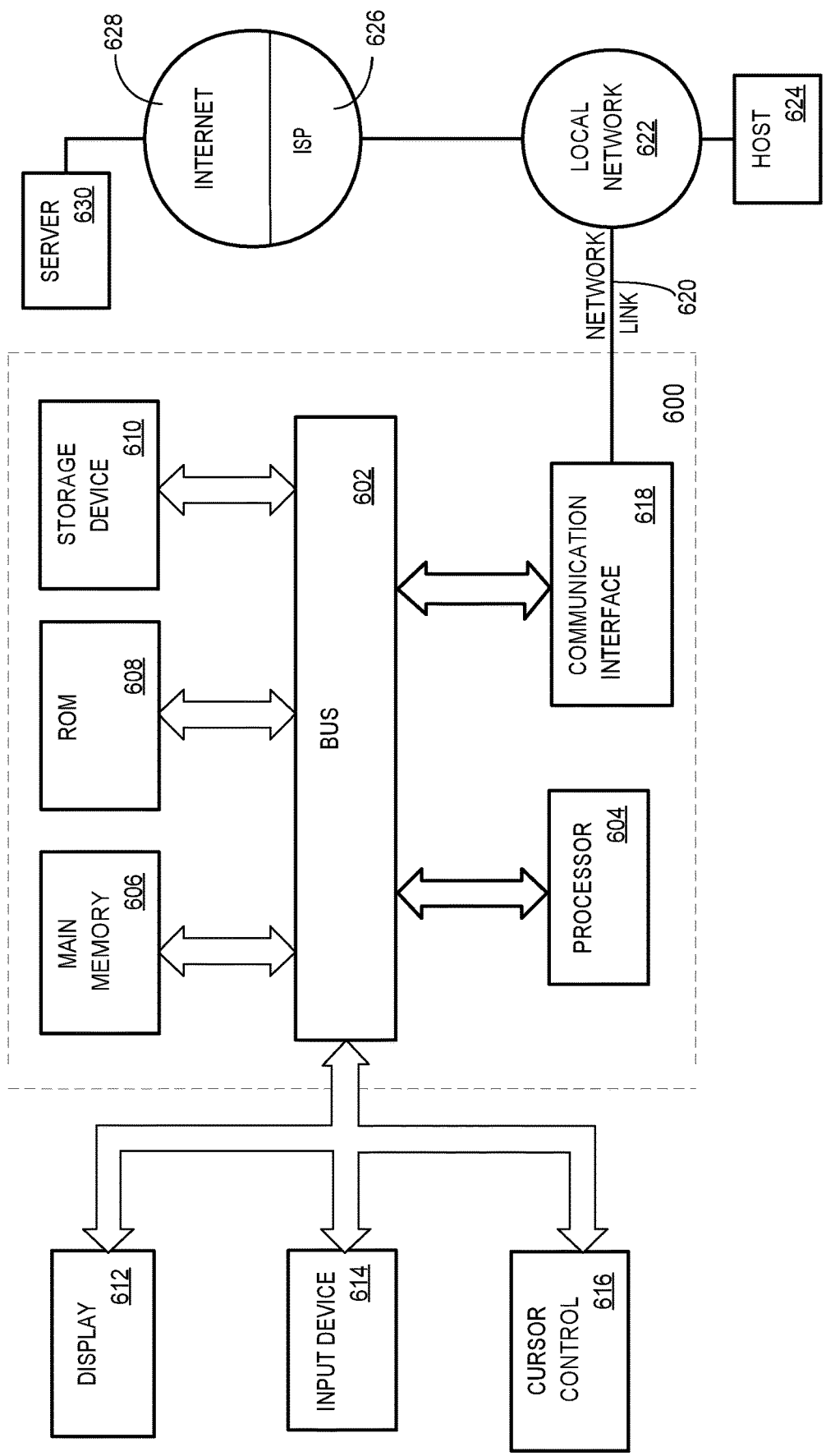
FIG. 6 is a block diagram that illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a liquid-crystal display (LCD) or a light-emitting diode (LED) display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Cloud Computing Overview

The techniques described herein are implemented using one or more processing solutions, examples of which include distributed systems, clustered computing systems, and cloud computing systems. In an embodiment, configuration management services 120 are part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to system 100, or to other entities within this description, is controllable via an interface that is exposed at a cloud computing system.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, in volatile or non-volatile storage, a composite template that includes a plurality of sub-templates;
   wherein the plurality of sub-templates includes a first sub-template for targets of a first target type and a second sub-template for targets of a second target type;
   for a composite target that includes a first set of member targets of the first target type, comparing, based on the first sub-template, configurations of the first set of member targets to determine whether the first set of member targets is consistent;
   after said comparing, detecting at least one of an addition of a member target to the first set of member targets or a removal of a member target from the first set of member targets;
   in response to said detecting, determining that the first set of member targets is not consistent based on at least re-comparing, based on the first sub-template, configurations of the first set of member targets;
   in response to determining that the first set of member targets is not consistent, outputting notification data that indicates that the composite target is not consistent;
   wherein the method is performed by one or more computing devices.

2. The method of claim 1,
   wherein re-comparing, based on the first sub-template, configurations of the first set of member targets comprises comparing one or more configurations, of a set of attributes identified by the first sub-template, on one or more respective member targets in the first set of member targets with a configuration, of the set of attributes identified by the first sub-template, on a first reference target from the first set of member targets.

3. The method of claim 1, further comprising computing a compliance score for the composite target based, at least in part, on how many attributes in the first set of member targets are consistent.

4. The method of claim 1, the method further comprising:
   comparing, based on the second sub-template, configurations of a second set of member targets of the second target type to determine whether the second set of member targets is consistent;
   wherein outputting, by the one or more computing devices, the notification data that indicates that the composite target is inconsistent is further responsive to a determination that the second set of member targets is not consistent.

5. The method of claim 1, wherein the first target type is based on a type of function performed by the first set of member targets and the second target type is based on a type of function performed by a second set of member targets of said second target type.

6. The method of claim 1, wherein the first target type and the second target type are at least one of a cluster and high availability service, a database service, a database machine, an application service, or a domain discovery service.

7. The method of claim 1, wherein the composite template is part of a consistency rule that is associated with the composite target; wherein the consistency rule is applied to the composite target to determine whether the composite target is consistent; wherein applying the consistency rule to the composite target includes said comparing, based on the first sub-template, configurations of the first set of member targets to determine whether the first set of member targets is consistent.

8. The method of claim 7, further comprising
   detecting a change in the composite template; and
   in response to detecting the change to the composite template, re-applying the consistency rule to a set of composite targets that are associated with the consistency rule.

9. The method of claim 1, wherein the first set of member targets is associated with a configuration profile, where the method further includes adding a new member to the first set of member targets based on comparing the configuration profile to the new member.

10. The method of claim 9, wherein said detecting is based on least said adding said new member.

11. One or more non-transitory storage media storing sequences of instructions, which when executed by one or more processors, cause:
   storing, in volatile or non-volatile storage, a composite template that includes a plurality of sub-templates;
   wherein the plurality of sub-templates includes a first sub-template for targets of a first target type and a second sub-template for targets of a second target type;
   for a composite target that includes a first set of member targets of the first target type, comparing, based on the first sub-template, configurations of the first set of member targets to determine whether the first set of member targets is consistent;
   after said comparing, detecting at least one of an addition of a member target to the first set of member targets or a removal of a member target from the first set of member targets;
   in response to said detecting, determining that the first set of member targets is not consistent based on at least re-comparing, based on the first sub-template, configurations of the first set of member targets;

in response to determining that the first set of member targets is not consistent, outputting notification data that indicates that the composite target is not consistent.

12. The one or more non-transitory storage media of claim 11, wherein re-comparing, based on the first sub-template, configurations of the first set of member targets comprises comparing one or more configurations, of a set of attributes identified by the first sub-template, on one or more respective member targets in the first set of member targets with a configuration, of the set of attributes identified by the first sub-template, on a first reference target from the first set of member targets.

13. The one or more non-transitory storage media of claim 11, wherein the sequences of instructions include instructions that, when executed said one or more processors, cause computing a compliance score for the composite target based, at least in part, on how many attributes in the first set of member targets are consistent.

14. The one or more non-transitory storage media of claim 11, wherein the sequences of instructions include instructions that, when executed said one or more processors, cause:
comparing, based on the second sub-template, configurations of a second set of member targets of the second target type to determine whether the second set of member targets is consistent;
wherein outputting the notification data that indicates that the composite target is inconsistent is further responsive to a determination that the second set of member targets is not consistent.

15. The one or more non-transitory storage media of claim 11, wherein the first target type is based on a type of function performed by the first set of member targets and the second target type is based on a type of function performed by a second set of member targets of said second target type.

16. The one or more non-transitory storage media of claim 11, wherein the first target type and the second target type are at least one of a cluster and high availability service, a database service, a database machine, an application service, or a domain discovery service.

17. The one or more non-transitory storage media of claim 11, wherein the composite template is part of a consistency rule that is associated with the composite target; wherein the consistency rule is applied to the composite target to determine whether the composite target is consistent; wherein applying the consistency rule to the composite target includes said comparing, based on the first sub-template, configurations of the first set of member targets to determine whether the first set of member targets is consistent.

18. The one or more non-transitory storage media of claim 17, wherein the sequences of instructions include instructions that, when executed said one or more processors, cause:
detecting a change in the composite template; and
in response to detecting the change to the composite template, re-applying the consistency rule to a set of composite targets that are associated with the consistency rule.

19. The one or more non-transitory storage media of claim 11, wherein the first set of member targets is associated with a configuration profile, where the method further includes adding a new member to the first set of member targets based on comparing the configuration profile to the new member.

20. The one or more non-transitory storage media of claim 19, wherein said detecting is based on least said adding said new member.

* * * * *